US 6,655,262 B2

(12) United States Patent
Arnedo et al.

(10) Patent No.: US 6,655,262 B2
(45) Date of Patent: Dec. 2, 2003

(54) TOASTER WITH ELECTROMAGNETIC RETAINING DEVICE

(75) Inventors: Julian Arnedo, Barcelona (ES); Antonio Basora Sanjuan, Barcelona (ES)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/362,552

(22) PCT Filed: Aug. 21, 2001

(86) PCT No.: PCT/FR01/02648
§ 371 (c)(1),
(2), (4) Date: Feb. 25, 2003

(87) PCT Pub. No.: WO02/15760
PCT Pub. Date: Feb. 28, 2002

(65) Prior Publication Data
US 2003/0172814 A1 Sep. 18, 2003

(51) Int. Cl.[7] .............................. A47J 37/08; H05B 1/02
(52) U.S. Cl. .................... 99/327; 99/329 P; 99/331; 99/385; 99/389; 219/492; 219/521
(58) Field of Search ........................... 99/326–333, 337, 99/338, 385, 389–393, 396, 400, 402; 219/492, 493, 494, 490, 481, 497, 505, 506, 491, 521, 525, 518, 519, 411–414; 392/373, 375, 337, 407; 361/147, 194; 335/20, 164, 166, 175, 179, 207; 426/523, 466, 243, 231–233

(56) References Cited

U.S. PATENT DOCUMENTS

| 1,893,989 | A | * | 1/1933 | Galer ..................... 99/390 X |
| 1,926,276 | A | * | 9/1933 | Forbes ...................... 99/332 |
| 1,967,209 | A | * | 7/1934 | Lawrence ................... 99/327 |
| 1,979,845 | A | * | 11/1934 | Schallis ..................... 99/332 |
| 2,631,523 | A | * | 3/1953 | Oliving ................... 99/331 X |
| 3,956,978 | A | * | 5/1976 | Borley .................... 99/329 R |
| 4,345,513 | A | * | 8/1982 | Holt ...................... 99/401 X |
| 5,018,437 | A | * | 5/1991 | San Juan .................... 99/327 |
| 5,044,263 | A | * | 9/1991 | Birkert et al. ............... 99/327 |
| 5,304,782 | A | * | 4/1994 | McNair et al. ......... 219/497 X |
| 5,771,780 | A | * | 6/1998 | Basora et al. ............ 99/389 X |
| 5,802,957 | A | * | 9/1998 | Wanat et al. .......... 219/521 X |
| 6,014,925 | A | * | 1/2000 | Basora et al. ................. 99/327 |

FOREIGN PATENT DOCUMENTS

DE          26 32 500 A1       1/1978

* cited by examiner

Primary Examiner—Timothy F. Simone
(74) Attorney, Agent, or Firm—Browdy and Neimark, P.L.L.C.

(57) ABSTRACT

The invention concerns a toaster comprising a housing (1) containing a bread-holder carriage (4) mobile between an ejecting position wherein it is returned by an elastic device (5) and a toasting position wherein it is retained by an electromagnetic device (14), the electromagnetic device (14) including a ferromagnetic component (15) secured to the bread-holder carriage (4) and an electromagnet (16) secured to the housing (1), and a control device acting on the circuit powering the coil (L) of the electromagnet.

10 Claims, 2 Drawing Sheets

TOASTER WITH ELECTROMAGNETIC RETAINING DEVICE

The present invention concerns a toaster comprising a housing containing heating means, a bread-holding carriage movable between an ejecting position to which it is returned by elastic means and a toasting position in which it is retained by an electromagnetic device. This latter comprises, on the one hand, a ferromagnetic part secured to the bread-holding carriage, and, on the other hand, an electromagnet secured to the housing. Control means act on the circuit powering the coil of said electromagnet in order to retain the bread-holding carriage during a toasting operation.

In toasters of this type, the coil of the electromagnet is supplied with current during the toasting operation in order to maintain the bread-holding carriage in a lowered position. At the end of the toasting operation, the supply of current is turned off, and the bread-holding carriage rises to the ejection position under the action of a spring.

These electromagnetic retaining devices can present problems concerning the raising of the bread-holding carriage at the end of the toasting operation. In effect, the ferromagnetic part of the bread-holding carriage retains a certain magnetization when the current in the electromagnet coil is interrupted. This magnetization, called residual magnetization, can be sufficiently strong to prevent the raising of the bread-holding carriage at the end of the toasting operation.

In order to avoid this problem, it is known to use high quality ferromagnetic material that has a weak residual magnetization, but these materials are more costly.

This problem is more serious when it is desired to obtain an electromagnetic retaining device of reduced size. In effect, in order to compensate for the decrease in the holding force of a ferromagnetic part having small dimensions, its magnetization is increased, but this leads to a stronger residual magnetization.

The invention aims to overcome these drawbacks and to provide an electromagnetic retaining device that is inexpensive and of reduced size.

According to the invention, the control means of the toaster are adapted to act on the means for interrupting the circuit for supplying power to the coil in a manner to apply a positive voltage to the coil during the toasting operation, then a negative voltage having a lower absolute value at the end of the toasting operation.

Due to this arrangement, the coil of the electromagnet creates a magnetic field that is weaker but in the opposite sense to that created during the toasting operation. This counteracts the residual magnetization of the ferromagnetic part. Thus, the attachment force of the ferromagnetic part is weaker and one obtains with certainty a return of the bread-holding carriage to the ejection position at the end of the toasting operation.

Other characteristics and advantages of the invention will appear from the description that will follow, given by way of non-limiting example, with reference to the attached drawings in which.

Figure 1:
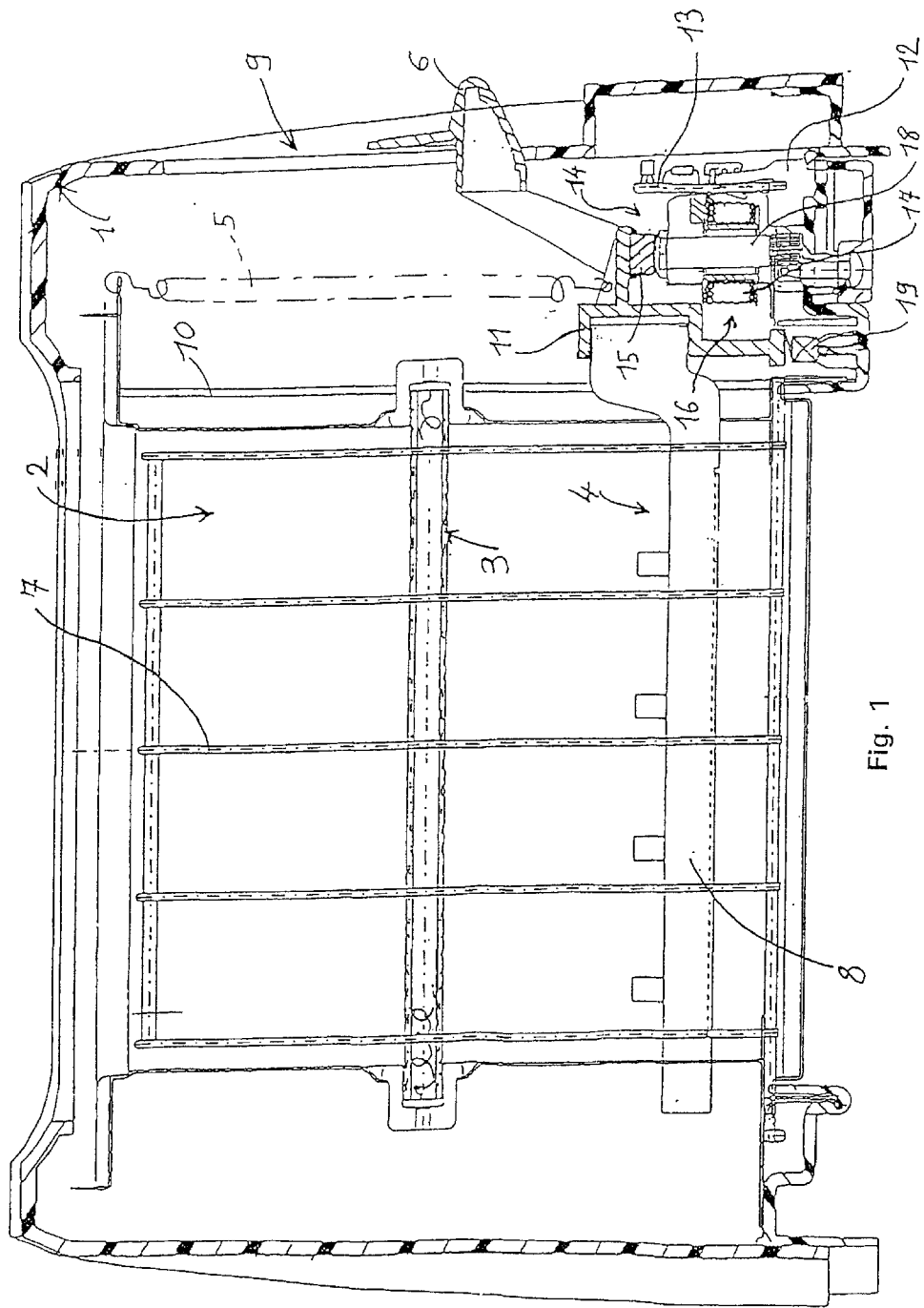
FIG. 1 is a cross-sectional view of a toaster comprising an electromagnetic retaining device.

As shown in FIG. 1, the toaster comprises a housing 1 with a toasting enclosure 2 open at its upper part in order to permit the introduction of a food product such as a bread slice. This toasting enclosure is delimited in its lower part by a bread-holding carriage 4 and laterally by two vertical grids 7 disposed symmetrically with respect to the vertical median plane of housing 1.

The housing has heating means 3 situated in proximity to the toasting enclosure. These heating means can be composed of two quartz heating tubes disposed horizontally along grids 7.

Bread-holding carriage 4 comprises a horizontal cross piece 8 extended by a displacing element 11 and a handle 6 extending out of housing 1 through a vertical opening 9. The breading holding carriage is vertically movably mounted between an upper position called ejection and a lower position, called toasting, corresponding to the position shown in FIG. 1. Vertical movement of carriage 4 can be guided by a sliding channel 10.

An elastic biasing means 5, such as a spring, maintains bread-holding carriage 4 in the ejection position and permits a user to lower the carriage to the toasting position by exerting a pressure on handle 6.

In the toasting position, carriage 4 is retained by an electromagnetic device 14 that comprises, on the one hand, a ferromagnetic part 15 secured to the bread-holding carriage, and on the other hand, an electromagnet 16 secured to housing 1 of the toaster. This electromagnet 16 has in a known manner an electric coil 17 connected to a power supply circuit and a ferromagnetic core 18 that permits the magnetic field created by coil 17 to be intensified.

The housing has control means that act on heating means 3 and on coil power supply circuit 17 to retain bread-holding carriage during the toasting operation. The control means and the coil power supply circuit are provided on a printed circuit board 13 mounted on a support 12 in proximity to electromagnet 16.

An end of travel contact 19 is connected to the control means on order to detect the lowering of bread-holding carriage 4 to the toasting position. The control means comprise means permitting the end of the toasting operation to be determined. It can be a matter of a timer or a sensor relating to the state of browning of the bread.

According to the invention, the control means act on the means for interrupting the power supply circuit of coil 17 in a manner to apply a positive voltage to the terminals of the coil during the toasting operation, but then a negative voltage having a lower absolute value at the end of the toasting operation. In a preferred manner, the supply voltage to the coil during the toasting operation is between 12V and 15V, then between −1.2V and −0.5V at the end of the toasting operation.

Thus, electromagnet 16 creates at the end of the toasting operation a magnetic field of opposite direction and lower intensity which reduces the residual magnetization of ferromagnetic part 15 secured to bread-holding carriage 4. Due to this arrangement, one can utilize a ferromagnetic part of low quality, for example one can use a sheet of ferromagnetic quality V600-65A instead of V350-50A. This arrangement also permits the use of a ferromagnetic part having smaller dimensions. With a ferromagnetic part having a surface area of 64 mm$^2$, the residual magnetization can exert an attaching force of 500 g which prevents return of the bread-holding carriage. The invention permits this attaching force to be limited to around 25 g.

Figure 2:
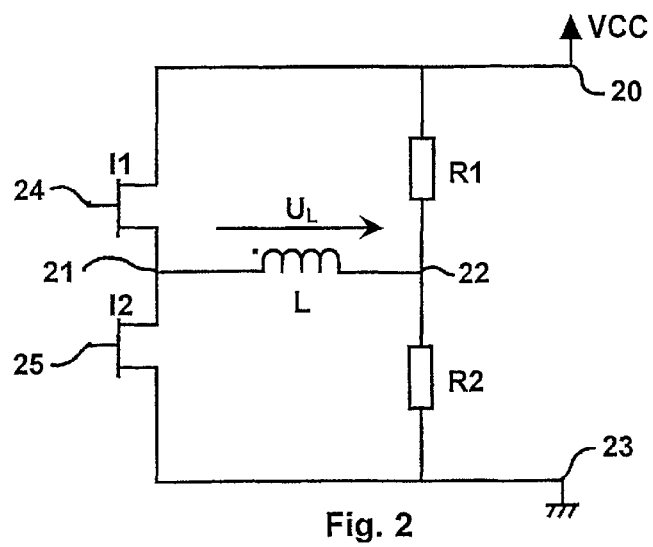
FIG. 2 is a diagram of a first embodiment of a power supply circuit of the electromagnetic retaining device.

FIG. 2 represents a first embodiment, according to the invention, of the power supply circuit for coil 17 represented schematically by reference character L.

This circuit comprises a direct current supply terminal 20, a first switching means I1 between supply terminal 20 and input 21 of coil L, a second switching means I2 between input 21 of the coil and ground 23, a first resistance R1 between power supply terminal 20 and output 22 of the coil, a second resistance R2, smaller than the first resistance R1, between output 22 of the coil and ground 23. The control means are adapted to maintain the first switching means I1 closed and the second switching means I2 open during the toasting operation. At the end of the toasting operation, the control means are adapted to open first switching means I1 and to close second switching means I2.

The direct current supply 20 is obtained from alternating current from the power mains with the aid of a transformer and rectifier device, its voltage VCC is 15V.

Resistances R1 and R2 are calculated in a manner to obtain a voltage $U_L$ between input 21 and output 22 of coil L of the order of 12V during the toasting operation, then a voltage $U_L$ of the order of −0.5V at the end of the toasting operation. This implies that the value of first resistance R1 is higher than that of second resistance R2.

The switching means (I1, I2) are produced with the aid of field effect transistors (FET) whose gates (24, 25) are connected to the control means. To close a switching means (I1, I2) thus provided, the control means supply a current of low intensity to the gate (24, 25) of the field effect transistor.

We are now going to describe the course of a toasting cycle.

The user lowers bread-holding carriage 4 to the toasting position, the end of travel contact 19 permits the control means to detect the start of the toasting operation. The control means then close first switching means I1 and open the second I2. Current circulates from direct current supply terminal 20 toward input 21 of the coil and passes through second resistance R2 in order to reach ground 23. The voltage $U_L$ at the terminals of the coil of the electromagnetic is 12 V. Ferromagnetic part 15 is magnetized by electromagnet 16 and maintains bread-holding carriage in the toasting position. The duration of the toasting operation is determined by the control means with the aid of a timer or of a browning sensor.

At the end of the toasting operation, the control means open first switching means I1 and close the second I2. Current then passes through first resistance R1 to output 22 of the coil, from where it circulates in parallel through L and second resistance R2. The voltage $U_L$ between the input and the output of the coil is −0.5V. The magnetic field created by electromagnet 16 is lower and opposed in sense to that created during the toasting operation and reduces the magnetization of ferromagnetic part 15. Bread-holding carriage 4 rises under the effect of pulling by elastic biasing means 5.

Figure 3:
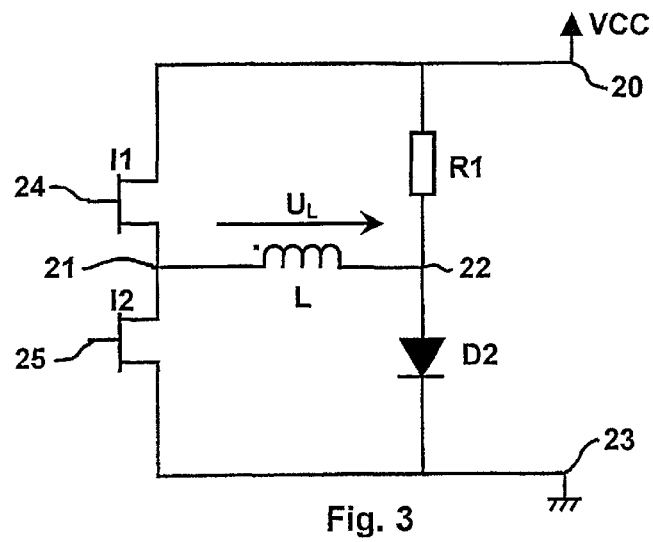
FIG. 3 is a diagram of a second embodiment of a power supply circuit of the electromagnetic retaining device.

FIG. 3 represents a second advantageous embodiment of the supply circuit for coil 17 represented schematically by the reference character L. The same reference characters have been retained for greater clarity.

This circuit comprises a direct current supply terminal 20, a first switching means I1 between supply terminal 20 and input 21 of coil L, a second switching means I2 between input 21 of the coil and ground 23, a first resistance R1 between supply terminal 20 and output 22 of the coil, a diode D2 allowing current to pass from output 22 of the coil toward ground 23. The control means are adapted to maintain first switching means I1 closed and second switching means I2 open during the toasting operation. At the end of the toasting operation, the control means are adapted to open first switching means I1 and to close second switching means I2.

Direct current supply 20 and the switching means (I1, I2) are identical to those of the first embodiment.

For diode D2 one selects a diode with a forward conduction voltage between 0.5V and 0.8V, for example a silicon junction diode that has a forward conduction voltage of 0.6V.

The value of first resistance R1 is calculated in a manner to limit the intensity of the current that passes through diode D2 at the end of the toasting operation.

The conduction voltage at the terminal of the diode D2 is essentially constant regardless of the current that passes through it. This conduction voltage corresponds to that applied to the coil when first switching means I1 is open and the second I2 is closed. Thus, to obtain a voltage $U_L$ between −0.5V and −0.8V it is sufficient to chose a diode whose forward conduction voltage is comprised between these 0.5V and 0.8V. Due to this arrangement, voltage $U_L$ is obtained in a direct and reliable manner. In addition, voltage $U_L$ is higher during the toasting operation, 14.4V instead of 12V, which increases the attachment force of ferromagnetic part 15.

The course of the toasting operation is analogous to that previously described.

Figure 4:
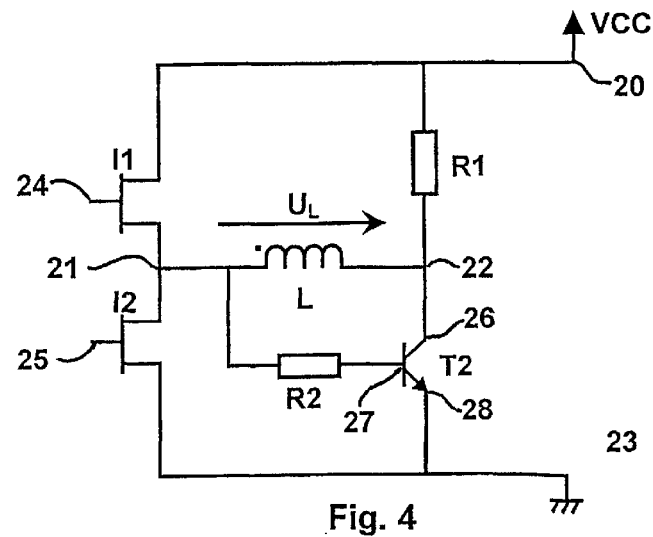
FIG. 4 is a diagram of a third embodiment of a power supply circuit of the electromagnetic retaining device.

FIG. 4 represents a third preferred embodiment of the supply circuit for coil 17. For the sake of simplification, the same reference characters are retained for the elements that are common to the proceeding embodiments.

This supply circuit for coil 17 comprises a first switching means I1 between a direct current supply terminal 20 and input 21 of the coil represented schematically by the reference character L, a second switching means I2 between input 21 of the coil and ground 23, a resistance R1 between direct current supply terminal 20 and output 22 of the coil, a transistor T2 of which the collector 26 is connected to output 22 of the coil, the base 27 is connected to input 21 of the coil and the emitter 28 is connected to ground 23, while the control means are adapted to maintain first switching means I1 closed and second switching means I2 open during the toasting operation, then to open first switching means I1 and to close second switching means I2 at the end of the toasting operation.

Direct current supply 20 and the switching means (I1, I2) are identical to those of the proceeding embodiments.

The transistor is preferably an NPN type transistor. Moreover, it is preferable to dispose a resistance R2 between input 21 of the coil and base 27 of transistor T2 in order to limit the control current and to prevent destruction of the transistor.

During a toasting operation, first switching means I1, constituted by a field effect transistor, is closed and the voltage at input 21 of the coil is close to the supply voltage VCC, i.e. 14.8V for a supply voltage VCC of 15V. A sufficiently high current circulates in base 27 of transistor T2 to saturate the latter. The voltage drop between collector 26 and emitter 28 of the transistor is almost zero and one obtains a voltage $U_L$ at the terminal of the coil closer to the supply voltage VCC, which is in the present case a voltage $U_L$ of 14.6V which creates a good attraction force. At the end of the toasting operation, second switching means I2 is closed and the voltage at base 27 of transistor T2 is almost zero. Transistor T2 no longer being conductive, the current passes through resistance R1 and circulates in coil L from output 22 toward input 21 and one obtains a negative voltage $U_L$ that permits creation of a repulsion force of the ferromagnetic part secured to the bread-holding carriage. This embodiment of the supply circuit for the coil is particularly advantageous since one can adjust the negative voltage $U_L$ at the end of the toasting operation by modifying the value of the resistance R1, while retaining $U_L$ close to that of the supply voltage VCC during the toasting operation in this preferred embodiment, the value of resistance R1 is calculated in a manner to obtain a voltage $U_L$ of −1.2V at the end of the toasting operation.

The invention, according to the three embodiments described, permits a raising of the bread-holding carriage to be guaranteed, even when using a ferromagnetic part of ordinary quality and of small dimension.

We claim:

1. Toaster comprising a housing (1) enclosing heating means (3), a bread-holding carriage (4) moveable between an ejection position into which it is biased by an elastic means (5) and a toasting position in which it is retained by an electromagnetic device (14), said electromagnet device comprising, on the one hand, a ferromagnetic part (15) secured to the bread-holding carriage (4), and on the other hand, an electromagnet (16) secured to the housing, as well as control means acting on the supply circuit of the coil (17) of the said electromagnet, characterized in that the control means are adapted to act on switching means (I1, I2), of the supply circuit for the coil (17) in a manner to apply a positive voltage ($U_L$) to the terminals of the coil during the toasting operation, then a negative voltage having a lower absolute value at the end of the toasting operation.

2. Toaster according to claim 1, characterized in that the supply circuit for the coil (17) comprises a first switching means (I1) arranged between a direct current supply terminal (20) and the input (21) of the coil (L), a second switching means (I2) between the input (21) of the coil and ground (23), a first resistance (R1) between the direct current supply terminal (20) and the output (22) of the coil, a second resistance (R2) between the output (22) of the coil and ground (23), while the control means are adapted to maintain the first switching means (I1) closed and the second switching means (I2) open during the toasting operation, then to open first switching means (I1) and to close second switching means (I2) at the end of the toasting operation.

3. Toaster according to claim 2, characterized in that voltage $U_L$ applied to the terminals of the coil (L) is of the order of 12V during the toasting operation, then of the order of −0.5V at the end of the toasting operation.

4. Toaster according to claim 3, characterized in that the value of first resistance (R1) is higher than that of second resistance (R2).

5. Toaster according to claim 1, characterized in that the supply circuit for the coil (17) comprises a first switching means (I1) between a direct current supply terminal (20) and the input (21) of the coil (L), a second switching means (I2) between the input (21) of the coil and ground (23), a first resistance (R1) between the direct current supply terminal (20) and the output (22) of the coil, a diode (D2) allowing current to pass from the output (22) of the coil toward ground (23), while the control means are adapted to maintain the first switching means (I1) closed and the second switching means (I2) open during the toasting operation, then to open the first switching means (I1) and to close the second switching means (I2) at the end of the toasting operation.

6. Toaster according to claim 5, characterized in that the diode (D2) has a forward conduction voltage of 0.6V.

7. Toaster according to claim 1, characterized in that the supply circuit for the coil (17) comprises a first switching means (I1) between a direct current supply terminal (20) and the input (21) of the coil L), a second switching means (I2) between the input (21) of the coil and ground (23), a resistance (R1) between the direct current supply terminal (20) and the output (22) of the coil, a transistor (T2) of which the collector (26) is connected to the output (22) of the coil, the base (27) is connected to the input (21) of the coil and the emitter (28) is connected to ground (23), while the control means are adapted to maintain the first switching means (I1) closed and the second switching means (I2) open during the toasting operation, then to open the first switching means (I1) and to close the second switching means (I2) at the end of the toasting operation.

8. Toaster according to claim 7, characterized in that the transistor (T2) is of the NPN type.

9. Toaster according to claim 8, characterized in that the value of the resistance (R1) is calculated in a manner to obtain a voltage $U_L$ of −1.2V at the end of the toasting operation.

10. Toaster according to claim 1, characterized in that the switching means (I1, I2) of the supply circuit for the coil are formed with the aid of field effect transistors of which the gates (24, 25) are connected to the control means.

* * * * *